United States Patent [19]
Lukavich et al.

[11] 3,762,079
[45] Oct. 2, 1973

[54] QUICK-CHANGE CUTTING EDGE

[75] Inventors: Paul J. Lukavich, Joliet, Ill.; Max J. Teasdale, Waterloo, Belgium

[73] Assignee: Caterpillar Tractor Co., Peoria, Ill.

[22] Filed: Oct. 2, 1972

[21] Appl. No.: 294,435

[52] U.S. Cl. ............................... 37/141 R, 172/770
[51] Int. Cl. ................................................ E02f 9/28
[58] Field of Search ..................... 37/141 R, 141 T, 37/142 R, 142 A; 16/2; 172/770

[56] References Cited
UNITED STATES PATENTS

| | | | |
|---|---|---|---|
| 3,664,044 | 5/1972 | Hahn | 37/142 R |
| 2,846,790 | 8/1958 | Davis et al. | 37/142 R |
| 1,959,847 | 5/1934 | Buskirk | 37/141 T |
| 3,621,594 | 11/1971 | Hahn et al. | 37/142 R |

*Primary Examiner*—Robert E. Pulfrey
*Assistant Examiner*—Eugene H. Eickholt
*Attorney*—John A. Bucher

[57] ABSTRACT

A replaceable cutting edge for an excavating bucket comprises a number of tip adapters which are mounted in laterally spaced apart, fixed positions on the leading edge of the bucket. Each of the tip adapters has at least one pair of vertically spaced apart flanges facing an adjacent tip adapter. A cutting edge section extends between each pair of adjacent tip adapters with the ends of the cutting edge section held in vertical position by the flanges on the tip adapters. A retaining pin, in the form of a wedge member, extends through aligned openings in the flanges and in the ends of the cutting edge sections to hold the cutting edge sections in horizontal position on the bucket leading edge. Each retaining pin has a tapered surface which mates with a corresponding tapered surface in the opening of the cutting edge section to force the cutting edge section to the rear and tight against the leading edge of the bucket.

4 Claims, 3 Drawing Figures

QUICK-CHANGE CUTTING EDGE

BACKGROUND OF THE INVENTION

This invention relates to a replaceable and quick-change cutting edge for an excavating bucket.

This invention relates particularly to a quick-change cutting edge which need not be attached to the bucket by welding so that the material selected for the cutting edge can be a high hardenability material rather than an easily weldable material.

THE PRIOR ART

Perhaps 50 to 60 percent of the loader buckets now in commercial use are equipped with teeth which improve penetration and which decrease cycle time. These teeth are pinned to adapters which are either bolted or welded to the cutting edge of the bucket. Wear of the cutting edge is reduced by having such teeth on the bucket, but the edge wears into a scallop shape. As the edge wears, it becomes blunt; and the cycle time increases. Eventually, it is necessary to replace the edge to increase the cycle time and efficiency. Since the prior art bucket cutting edges have usually been integral with the bucket and welded in place, they have been rather time consuming to replace. It often takes about 15 hours for such replacement. The prior art cutting edges have also been manufactured from a material that has good weldability. However such materials have not exhibited the most desirable characteristics for hardenability.

SUMMARY OF THE INVENTION

It is a primary object of the present invention to construct a quick-change, replaceable cutting edge which reduces the down time necessary to change the cutting edge.

It is a related object to mount the cutting edge on the bucket by means other than welding.

It is a further object to reduce the amount of throw-away material during changing of the cutting edge.

It is a further object to increase the selection of materials available for the cutting edge by not requiring welding of the cutting edge to the bucket. This in turn permits better heat treat characteristics.

In accordance with the present invention a replaceable cutting edge for an excavating bucket comprises a plurality of tip adapters mounted in laterally spaced apart, fixed positions on the leading edge of the bucket.

Each tip adapter has at least one pair of vertically spaced apart flanges which face an adjacent tip adapter.

A cutting edge section extends between each pair of adjacent tip adapters. The ends of the cutting edge section are held in vertical position by the flanges on the tip adapters.

The flanges and the ends of the cutting edge sections have aligned openings. A retaining pin extends through the aligned openings for holding the sections in horizontal position on the bucket leading edge.

The retaining pin has a wedge-shape with a tapered surface mating with a corresponding tapered surface in the opening of the cutting edge section to force the cutting edge section to the rear and tight against the leading edge of the bucket.

A replaceable cutting edge constructed to have the specific structural features noted above and effective to function in the ways described above constitutes a further, specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

TECHNICAL DISCLOSURE OF THE INVENTION

Figure 1:
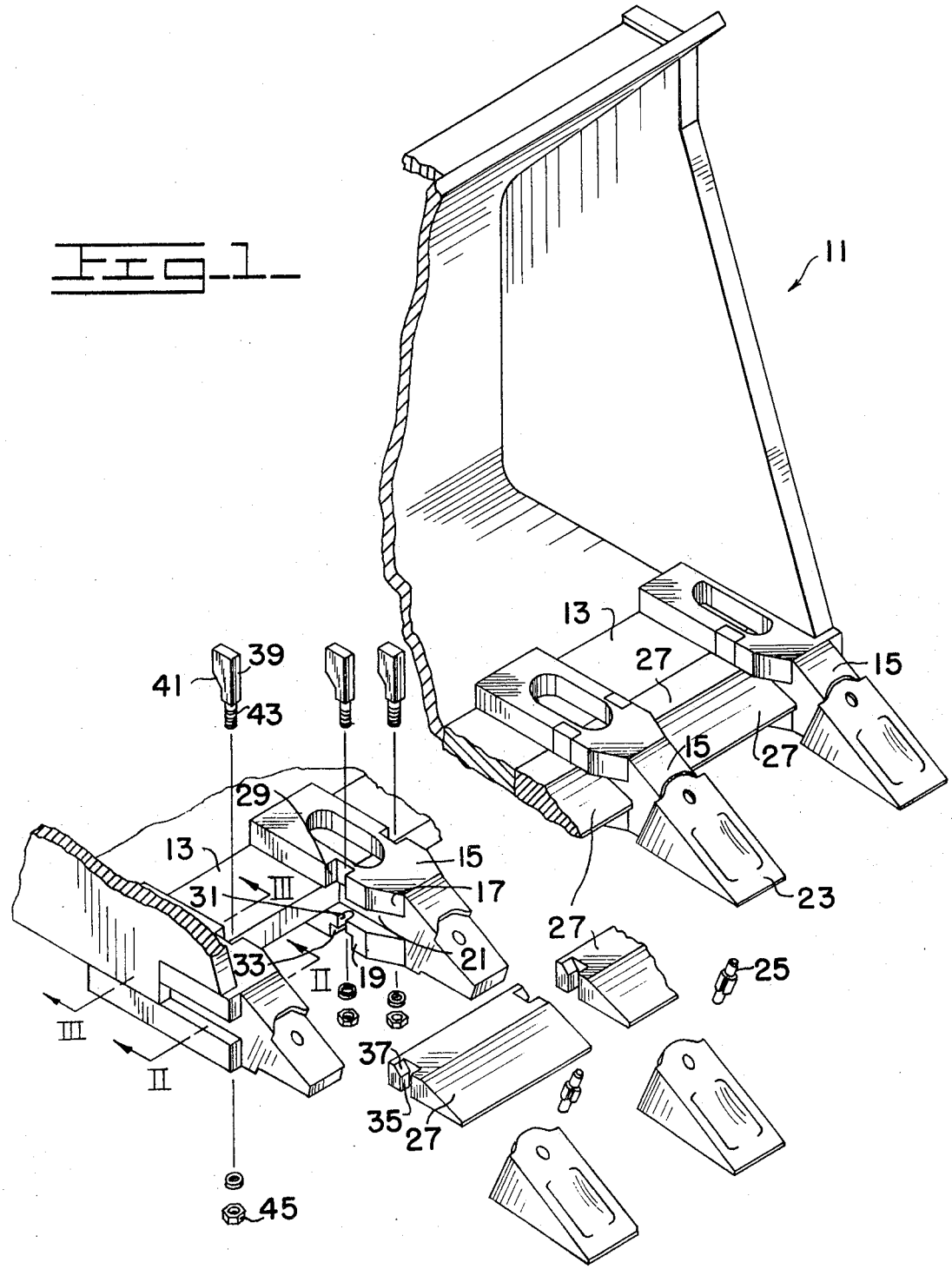
FIG. 1 is an isometric view (broken away and exploded in parts to details of contruction) of a bucket having a replaceable cutting edge constructed in accordance with one embodiment of the present invention.
Figure 2:
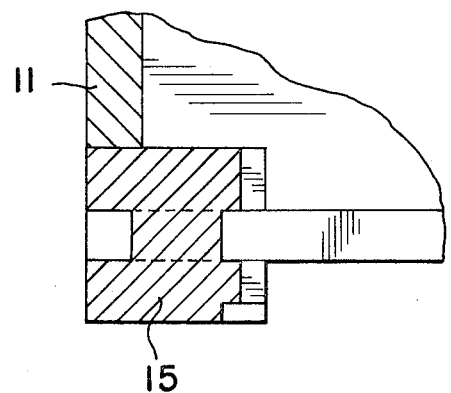
FIG. 2 is a cross-section view taken along a line and in the direction indicated by the arrows II—II in FIG. 1.
Figure 3:
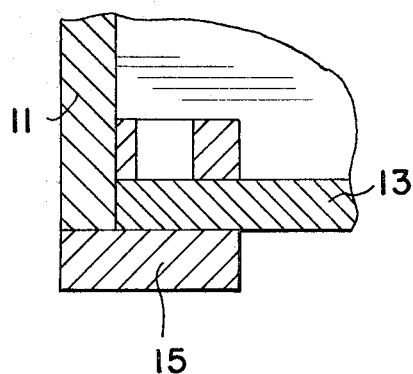
FIG. 3 is a cross-section view taken along a line and in the direction indicated by arrows III—III in FIG. 1.

An excavator bucket having a replaceable cutting edge constructed in accordance with one embodiment of the present invention is indicated generally by the reference numeral 11 in FIG. 1.

The bucket 11 has an adapter 13 at the leading edge of the bucket. The cutting edge adapter 13 extends the full width of the bucket and is welded integral with the bucket. This cutting edge adapter is approximately one half the width of the standard cutting edge.

A plurality of bifurcated tooth or tip adapters 15 are mounted in laterally spaced apart, fixed positions on the cutting edge adapter 13.

Each adapter 15 has an upper flange 17 and a lower flange 19. The flanges are vertically spaced to define a groove or slot 21 between the flanges. These flanges are formed on the sides of the adapter which face an adjacent adapter. Thus, the adapters in the mid-part of the bucket have flanges on both sides and present an I beam configuration in cross-section.

The adapters at the corners of the bucket may also have this double flange, I beam configuration, or alternatively may have flanges on only the inside of the adapter.

The rear ends of the adapters 15 are bifurcated to straddle the cutting edge adapter 13.

The adapters 15 can be welded or can be bolted to the cutting edge adapter 13.

The leading, wedge-shaped nose of each adapter 15 receives a replaceable bucket tip 23.

The tip 23 is secured to the adapter 15 by a retaining pin assembly 25.

The adapter nose, the tip 23 and the retaining pin assembly 25 are all of conventional construction.

The tooth adapters 15 can be manufactured by a number of different manufacturing processes, such as forging, casting or fabricating.

In accordance with the present invention a replaceable cutting edge section 27 extends between each pair of adjacent tip adapters 15.

The ends of the cutting edge section are held in vertical position by the flanges on the tip adapters.

Each flange 17 of each tip adapter 15 has an opening 29.

Each flange 19 of each tip adapter 15 has an opening 31.

The lower part of each opening 31 is counterbord to provide a larger opening 33 for a socket wrench.

Each end of each cutting edge section 27 has an opening 35.

The upper part of the rear surface of each opening 35 is tapered or inclined as indicated by the reference numeral 37.

Retaining wedges 39 are associated with each end of each cutting edge section 27.

The retaining wedges 39 have a tapered lower surface 41 which engages with the tapered surface 37 of cutting edge section 27.

Each retaining wedge 39 has a threaded lower end 43 for the reception of a nut 45.

In the assembly of the replaceable cutting edge shown in FIG. 1, the replaceable cutting edge sections 27 are slid into the grooves 21 with the tips 23 removed. The openings 35 in the cutting edge sections 27 are aligned with the openings 29 and 31 in the flanges, and the retaining wedges 39 are knocked into place. The tapered surfaces 41 of the retaining wedges act against the tapered surfaces 37 of the cutting edge sections 27 to force the cutting edge sections to the rear and tight against the cutting edge adapter 13.

The nuts 45 are then tightened and the tips 27 are mounted on the adapters 15.

The removal of a worn cutting edge can be accomplished in several ways.

The most desirable would be simply to remove the retaining wedges by loosening the nut, removing the wedges and sliding the cutting edge section from the grooves or notches between the flanges of the tip adapters after the tips have been removed.

It may be that, due to normal wear on the nuts or the wedges, the nuts cannot be readily removed. In this case a torch can be used to burn the nut from the wedges.

The cutting edge sections can also be cut by a torch into two sections, providing clearance for them to be removed.

The cutting edge sections may be manufactured by several different methods. They may be manufactured as a rolled section, or they may be cast or forged.

A great variety of steels is available since the steel selected does not have to be limited to a material which permits welding. Since the cutting edge sections do not have to be welded it is possible to select a steel that has greater hardenability, and thus more wear life.

The replaceable cutting edge of the present invention reduces down time necessary to change the cutting edge since welding is not required. It reduces the amount of throw-away material. And it increases the selection of materials available since it is no longer necessary to pick a material which has good welding characteristics.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A replaceable cutting edge for an excavating bucket and comprising, tip adapters mounted in laterally spaced part, fixed positions on the leading edge of the bucket, each of said tip adapters having at least one pair of vertically spaced apart flanges facing an adjacent tip adapter, a cutting edge section extending between each pair of adjacent adapters with the ends of the cutting edge section held in vertical position by the flanges on the tip adapter, aligned openings in the flanges and in the ends of the cutting edge sections, and the retaining means extending through the aligned openings for holding the sections in horizontal position on the bucket leading edge, whereby the cutting edge sections can be removed and replaced by removing the retaining means from the aligned openings and by sliding the cutting edge sections out from between the flanges of the tip adapters.

2. A replaceable cutting edge as defined in claim 1 wherein the openings in the cutting edge section have tapered surfaces and the retaining means comprise wedge members having complementary inclined surfaces for forcing the cutting edge section to the rear and tight against the leading edge of the bucket.

3. A replaceable cutting edge as defined in claim 1 including an edge adapter extending the full width of the bucket on the leading edge of the bucket.

4. A replaceable cutting edge as defined in claim 1 wherein the cutting edge sections are of small width front to back to minimize the amount of throw-away material during change-over of the cutting edge and wherein the cutting edge sections have high hardenability for longer wear life.

* * * * *